United States Patent
Zuin

[11] Patent Number: 6,068,514
[45] Date of Patent: May 30, 2000

[54] SURFACE MOUNT ELECTRICAL CONNECTOR

[75] Inventor: Gianni Zuin, Mestrino-Padova, Italy

[73] Assignee: Molex Incorporated, Lisle, Ill.

[21] Appl. No.: 09/179,432

[22] Filed: Oct. 27, 1998

[30] Foreign Application Priority Data

Nov. 17, 1997 [EP] European Pat. Off. ............. 97120072

[51] Int. Cl.[7] .................................................. H01R 13/44
[52] U.S. Cl. ........................... 439/630; 439/734; 439/862
[58] Field of Search ..................................... 439/630, 629,
439/260, 862, 733.1, 722, 736, 331, 326,
70, 71, 72, 73, 74, 75, 83

[56] References Cited

U.S. PATENT DOCUMENTS

| | | | |
|---|---|---|---|
| 4,732,565 | 3/1988 | Ito et al. ..................................... | 439/83 |
| 5,013,255 | 5/1991 | Juret et al. ................................ | 439/260 |
| 5,188,534 | 2/1993 | Bertho et al. ............................. | 439/79 |
| 5,226,826 | 7/1993 | Nillson et al. ............................ | 439/72 |
| 5,231,274 | 7/1993 | Reynier et al. .......................... | 235/441 |
| 5,259,769 | 11/1993 | Cruise et al. ............................. | 439/862 |
| 5,320,552 | 6/1994 | Reichardt et al. ....................... | 439/331 |
| 5,527,192 | 6/1996 | Juret ........................................ | 439/862 |

FOREIGN PATENT DOCUMENTS 704820  3/1996  European Pat. Off. .

*Primary Examiner*—Paula Bradley
*Assistant Examiner*—Tho D. Ta
*Attorney, Agent, or Firm*—Stacey E. Caldwell

[57] ABSTRACT

A low profile surface mount electrical connector is provided for connecting an electronic component such as an IC card on a planar surface of a printed circuit board which includes circuit traces thereon. The connector includes a generally flat insulating housing overmolded about a plurality of stamped and formed electrical terminals. The housing has a bottom surface. Each terminal includes a generally planar surface mount portion projecting from the housing generally coplanar with the bottom surface thereof for electrical connection to a circuit trace on the planar surface of the printed circuit board. Each terminal includes a contact arm portion folded back over the surface mount portion for electrical connection to the electronic component.

15 Claims, 5 Drawing Sheets

SURFACE MOUNT ELECTRICAL CONNECTOR

FIELD OF THE INVENTION

This invention generally relates to the art of electrical connectors and, particularly, to a surface mount electrical connector which preferably has a low profile and has terminals for such uses as in IC card reader systems.

BACKGROUND OF THE INVENTION

Low profile electrical connectors are required in a variety of applications, such as in a surface mount electrical connector for connecting an electronic component, such as an IC card, on a planar surface of a printed circuit board. In fact, the outer dimensions of the contacting apparatus in such systems often is not significantly larger than the IC card itself.

With the advent of such apparatus as palmtop computers and pocket-size cellular telephones, there is a constant demand to make the electrical components, including electrical connectors, smaller and lighter in weight. In cellular telephones, for example, there is a constant demand for making smart card connectors, such as SIM-style card readers, as small as possible. Some connector manufacturers simply scale down the dimensions of a conventional connector design to achieve smaller and more dense connectors. However, simply miniaturizing the connectors compromises the connector performance and reliability since smaller dimensions do not always equal the same performance and reliability.

Another, more successful approach to increasing the density of electrical components on a given circuit board and, thereby, reduce the size and weight of the apparatus, is to have all of the components to be true surface mount components. In other words, components that are entirely on one surface of the printed circuit board are used so that the opposite surface of the printed circuit board can be used for mounting other surface mount components. Surface mount connectors, however, have problems or concerns which are separate and distinct from through-hole connectors, such as positioning and coplanarity problems that are not present if the terminals include tail portions or leads which extend through the printed circuit board. One approach to improving the coplanarity of surface mount terminal leads is to increase the resiliency of the leads so that, when the connector is placed on the surface of the printed circuit board, the leads deform to take up any tolerances that allow them to be brought in line, or coplanar, with the other surface mount leads. If an individual surface mount lead is not sufficiently resilient and does not deform to the position of the other leads, some of the surface mount leads will be in contact with the printed circuit board while others will not be in contact with the board.

Surface mount connectors as described above, such as smart card connectors, typically include terminals having resilient contact beams that make contact with the contacts of the IC card or module. It is critical that these cantilevered beams be sufficiently resilient such that all of the contact beams make contact with the IC card contacts. The resiliency of a contact beam typically is determined by a bend in the terminal. The terminals of such connectors also include a surface mount tail which is soldered to circuit traces on the surface of the printed circuit board. Typically, the surface mount tails project from a body or housing of the connector and are formed downwardly to make contact with the surface of the printed circuit board. Therefore, with the solder tails bent downwardly and the cantilevered beams bent upwardly, there often is a trade-off between the resiliency of the surface mount tails and the cantilevered contact beams, because the height or profile of the overall connector apparatus is given or at least extremely limited.

The present invention is directed to solving these problems and particularly solving the dilemma between the resiliency of the surface mount tails and the cantilevered contact beams in order to maximize the resiliency of the terminals without increasing the height or profile of the connector apparatus.

SUMMARY OF THE INVENTION

An object, therefore, of the invention is to provide a new and improved surface mount electrical connector of the character described.

In the exemplary embodiment of the invention, the electrical connector is a low profile connector for connecting an electronic component such as an IC card on a planar surface of the printed circuit board which includes circuit traces thereon. The connector, generally, includes a flat insulating housing overmolded about a plurality of stamped and formed electrical terminals. Specifically, the housing has a bottom surface, and each terminal includes a generally planar surface mount portion projecting from the housing generally coplanar with the bottom surface thereof for electrical connection to a circuit trace on the planar surface of the printed circuit board. Each terminal includes a contact arm portion folded back over the surface mount portion for electrical connection to the electronic component.

As disclosed herein, the generally planar surface mount portion of each terminal is wider than the contact arm portion thereof. The contact arm portion includes an outwardly bowed contact section for positively engaging the electronic component.

The insulating housing may include a feature comprising a pair of spaced projections along opposite sides of the array of terminals. The spaced projections protect the terminals and also provide a guide means for guiding an IC card into engagement with the contact arm portions of the terminals.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
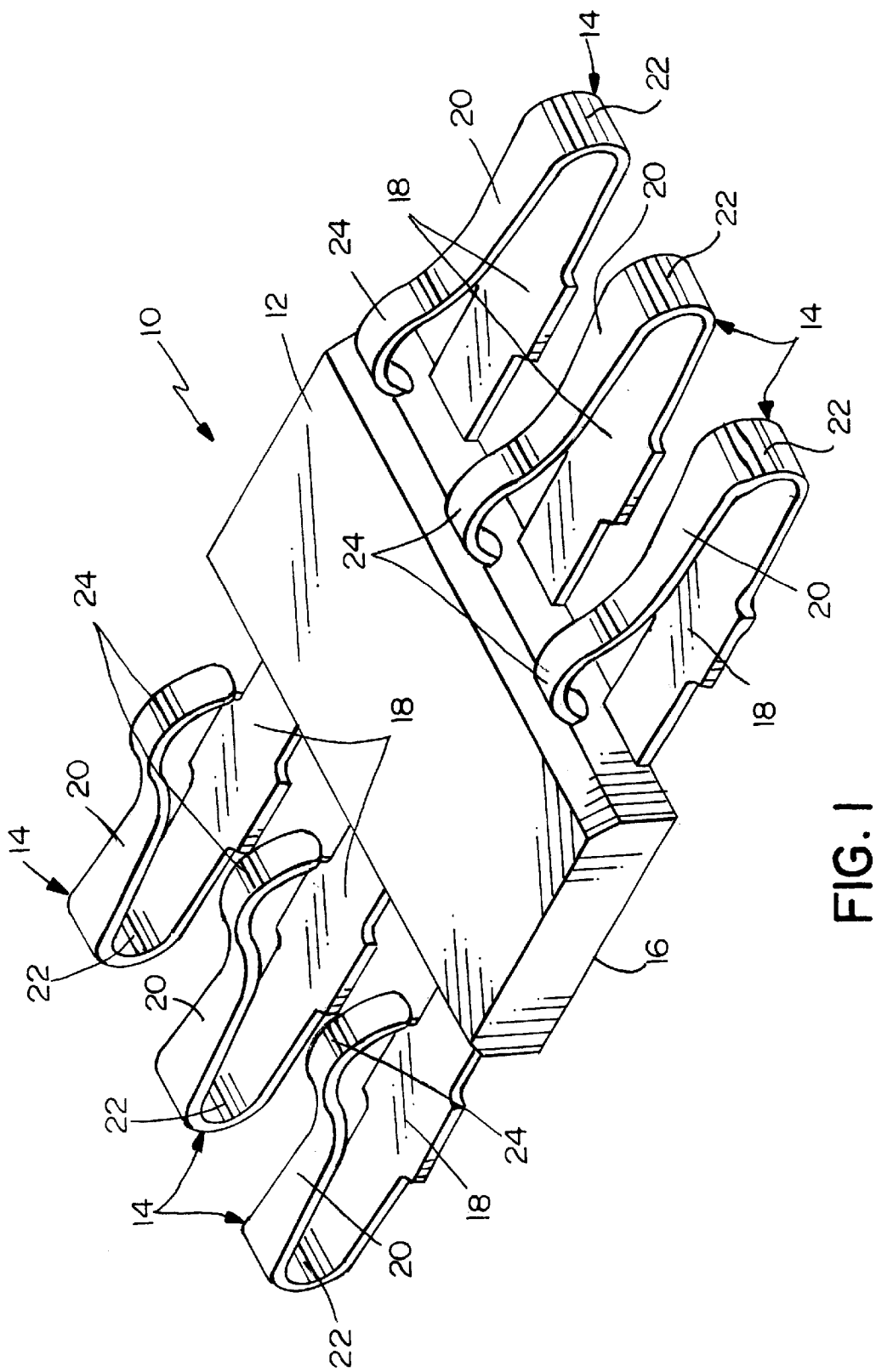
FIG. 1 is a perspective view of a low profile surface mount electrical connector incorporating the concepts of the invention.

Referring to the drawings in greater detail, and first to FIG. 1, the invention is embodied in a low profile surface mount electrical connector, generally designated 10. The connector includes a generally flat insulating housing 12 overmolded about a plurality of stamped and formed electrical terminals, generally designated 14. The housing has a flat bottom surface 16 for surface mounting on a printed circuit board, as will be seen hereinafter.

Each terminal 14 includes a generally planar surface mount portion 18 projecting from housing 12 generally coplanar with bottom surface 16 of the housing. The surface mount portions 18 are adapted for electrical connection to circuit traces on a planar surface of a printed circuit board, as will be seen hereinafter.

Each terminal 14 also includes a cantilevered contact arm portion 20 folded back, as at 22, over the surface mount portion 18 of the terminal for electrical connection to an electronic component, such as a contact on an IC card. With the terminals being stamped and formed of conductive sheet metal material, the terminals are bent at 22 perpendicular to the plane of the sheet metal material to juxtapose cantilevered contact arm portions 20 over planar surface mount portions 18. In the preferred embodiment, the contact arm portions further are formed or bent out of the plane of the sheet metal material to form upwardly or outwardly bowed contact sections 24 which actually engage the contacts of the IC card. These narrower smaller contact sections provide a concentrated or positive engagement with the IC card contacts.

Figure 2:
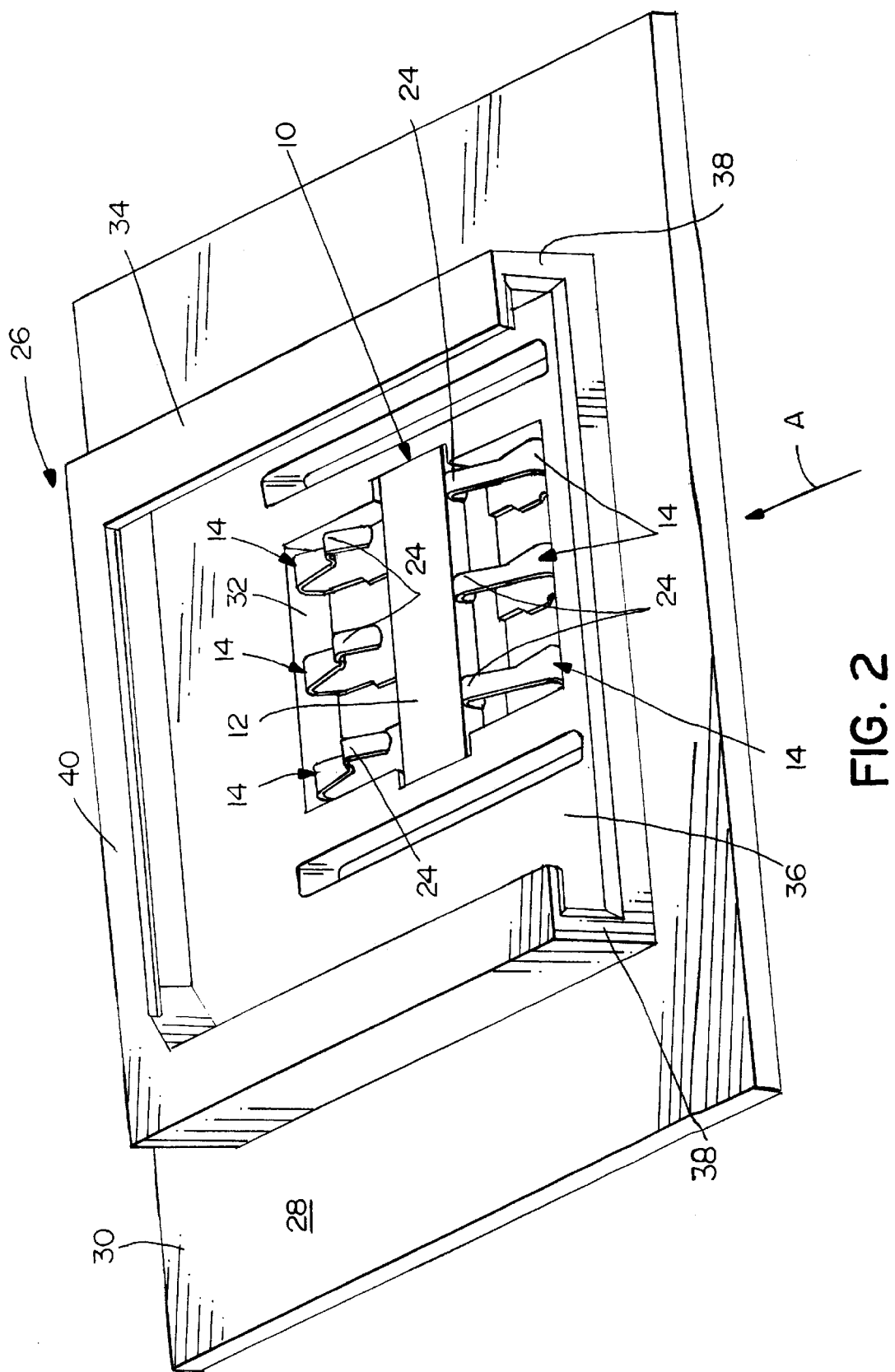
FIG. 2 is a perspective view of the connector used in a card reader apparatus.

FIG. 2 shows one application of surface mount electrical connector 10 in a card reader apparatus, generally designated 26. Specifically, the connector is mounted on a top planar surface 28 of a printed circuit board 30. The connector is located in a recess 32 of an IC card guide, generally designated 34. The guide has a generally flat base wall 36 within which recess 32 is formed, whereby the base wall provides protection for terminals 14 of connector 10. The guide has a pair of generally parallel side channels 38 and a rear channel 40. The side channels guide an IC card inserted into the apparatus in the direction of arrow "A", and rear channel 40 provides a stop limit of insertion for the card. When fully inserted, contacts on the underside of the card are located for engagement with upwardly bowed contact sections 24 of terminals 14.

Figure 3:
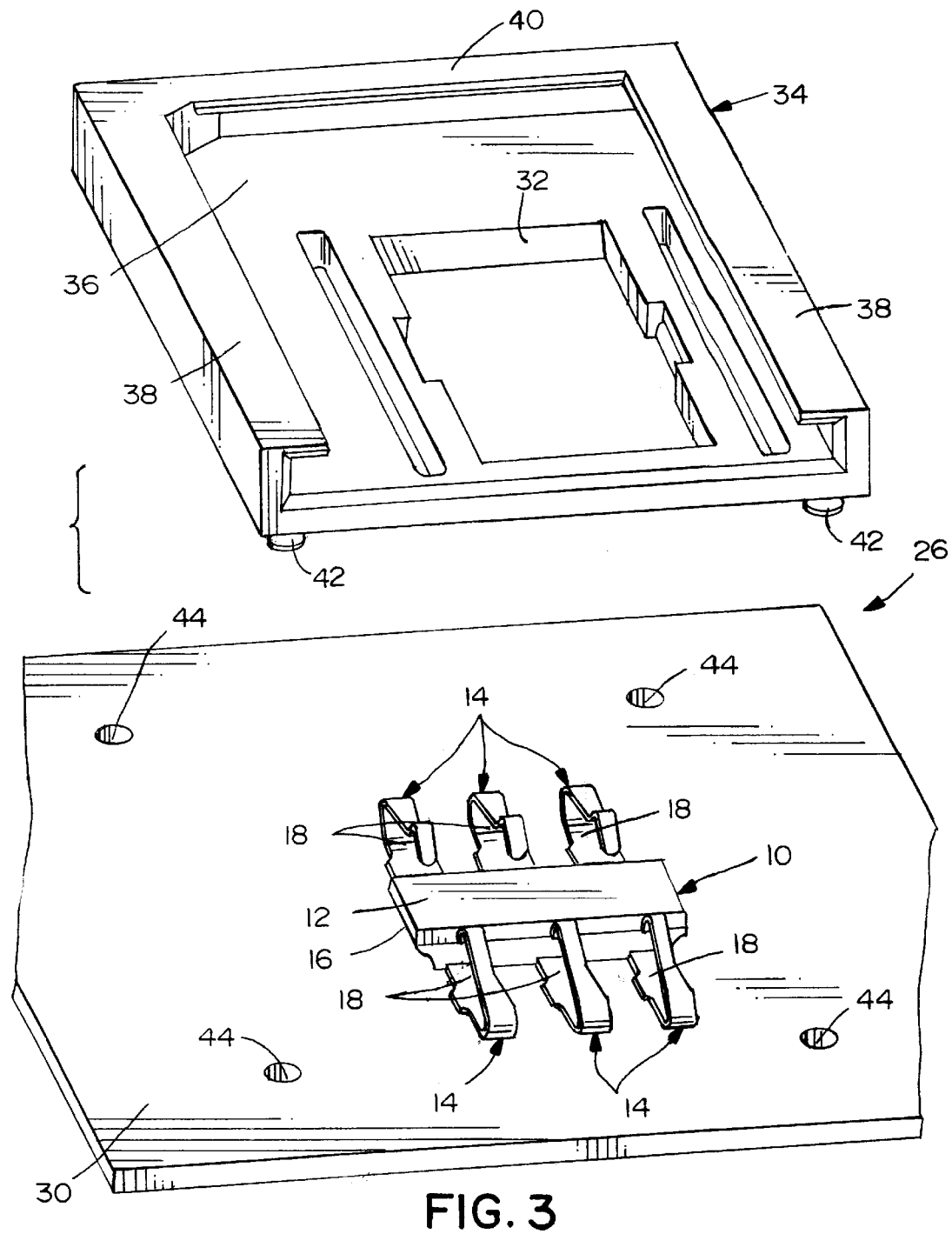
FIG. 3 is a perspective view of the connector surface mounted on the printed circuit board of the apparatus of FIG. 2, prior to assembling the card guide on the circuit board.

FIG. 3 shows connector 10 surface mounted on top planar surface 28 of printed circuit board 30. Planar surface mount portions 18 of terminals 14 are soldered to appropriate circuit traces (not shown) on the top surface of the circuit board. Guide 34 then can be mounted on the printed circuit board by inserting mounting pegs 42 projecting from the underside of the guide, into mounting holes 44 in the printed circuit board.

From the foregoing, it can be understood that with planar surface mount portions 18 of terminals 14 projecting from overmolded housing 12 coplanar with bottom surface 16 of the housing, the radius of curvature of bent portions 22 of the terminals is absolutely maximized for any given height or profile of the connector (i.e. the height above planar surface 28 of printed circuit board 30). Therefore, the resiliency of cantilevered contact arm portions 20 (and the bowed contact sections 24 thereof) is maximized to minimize any problems due to lack of coplanarity of contact sections 24 which must engage coplanar contacts on a flat, planar IC card.

Figure 4:
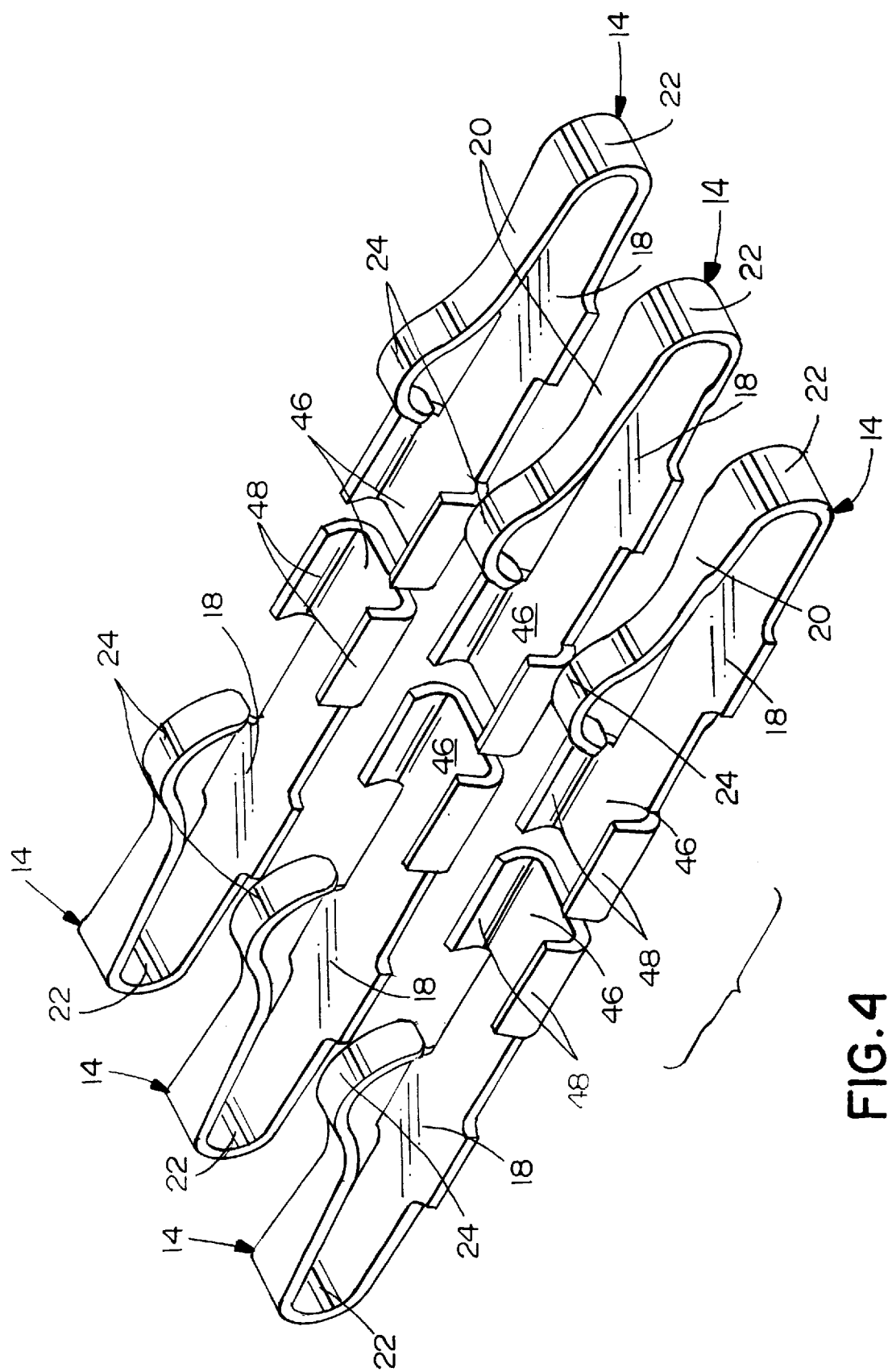
FIG. 4 is a perspective view of the array of terminals prior to having the connector housing overmolded thereon.

FIG. 4 shows the array of terminals 14 prior to having housing 12 overmolded thereon. The housing is molded of insulating plastic material. It can be understood that planar surface mount portions 18 of the terminal can be positioned in a high precision jig and be held in a precise coplanar relationship while the plastic housing 12 is overmolded thereon. In order to rigidly fix the terminals in the overmolded housing and to maintain the coplanarity of surface mount portions 18, each terminal 14 has a body portion 46 with upstanding ears or flanges 48 which become embedded in the material of the overmolded housing. Body portions 46 simply are coplanar extensions of planar surface mount portions 18 of the terminals.

Figure 5:
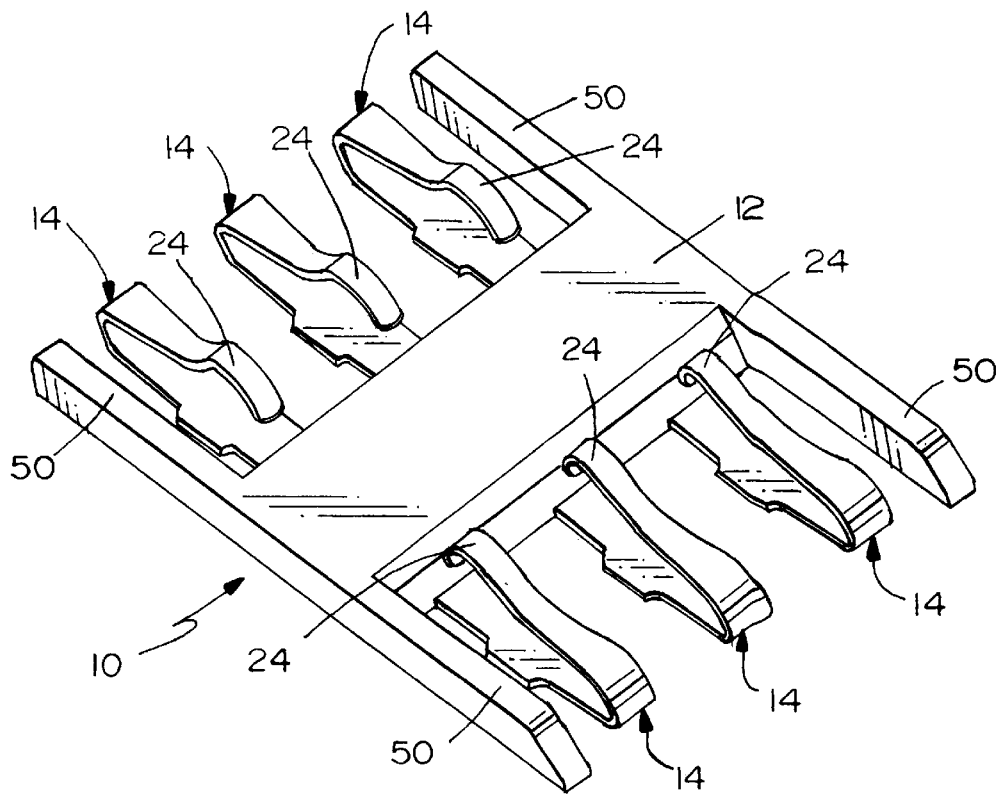
FIG. 5 is a perspective view of an alternate embodiment of the connector, including end projections of the connector housing.
Figure 6:
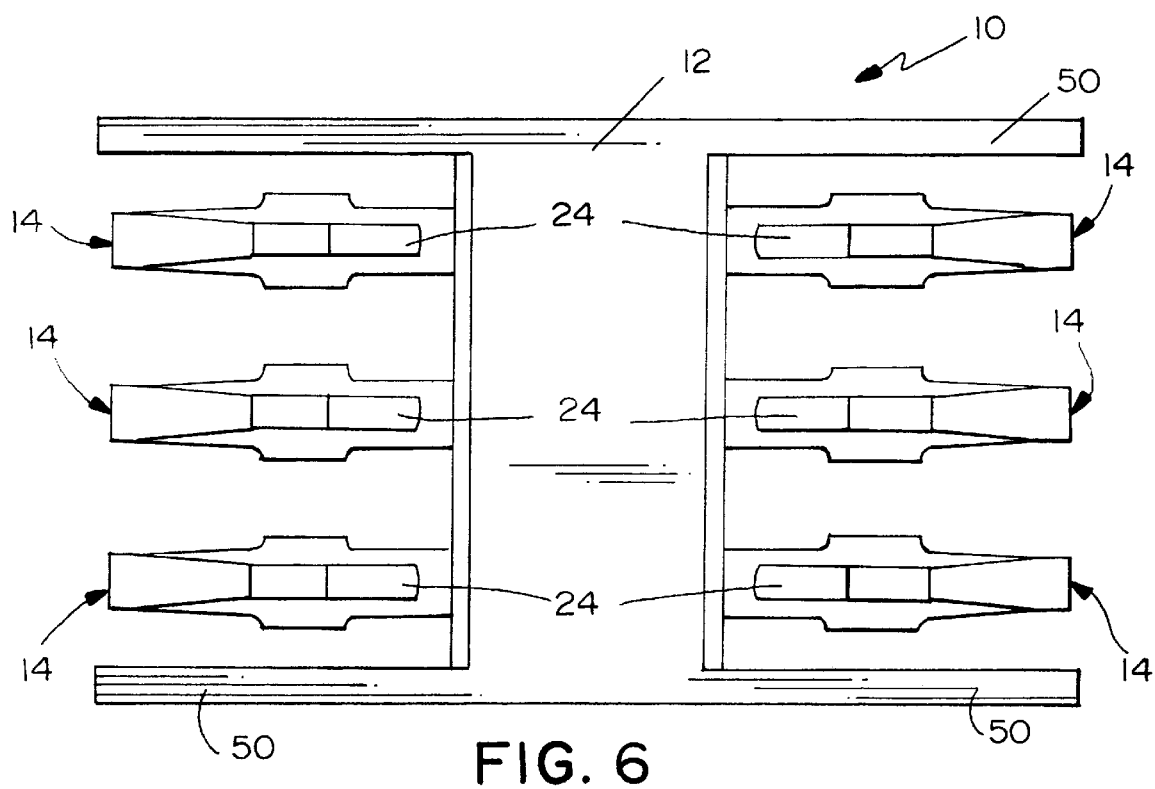
FIG. 6 is a top plan view of the embodiment of FIG. 5.

FIGS. 5 and 6 show another embodiment of connector 10 wherein housing 12 is provided with a pair of projections or arms 50 which project laterally of the housing along each opposite end of the array of terminals 14. This embodiment might be used in applications wherein the connector is not disposed in a recess which protects the terminals as in the application of FIGS. 2 and 3. Projections or arms 50 in the embodiment of FIGS. 5 and 6 perform a dual function of providing protection for terminals 14, as well as providing a guide for directing an IC card toward outwardly bowed contact sections 24 of the terminals.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A low profile surface mount electrical connector for connecting an electronic component such as an IC card on a planar surface of a printed circuit board which includes circuit traces thereon, comprising:

a generally flat insulating housing overmolded about two rows of stamped and formed electrical terminals, wherein said housing is generally rectangular and is located between the two rows of terminals, wherein the housing includes a bottom surface, and wherein each terminal includes a generally planar surface mount portion projecting away from the housing generally coplanar with the bottom surface thereof for electrical connection to one of the circuit traces on the planar surface of the printed circuit board and a cantilevered contact arm portion integral with and projecting from the surface mount portion toward the housing and folded back over the surface mount portion for electrical connection to said electronic component.

2. The low profile surface mount electrical connector of claim 1 wherein the generally planar surface mount portion of each terminal is wider than the contact arm portion thereof.

3. The low profile surface mount electrical connector of claim 1 wherein said insulating housing includes a pair of spaced projections for guiding the IC card into engagement with the contact arm portions of the terminals.

4. The low profile surface mount electrical connector of claim 1 wherein the contact arm portion of each terminal includes an outwardly bowed contact section for positively engaging the electronic component.

5. The low profile surface mount electrical connector of claim 4 wherein said bowed contact section is narrower than the surface mount portion of the terminal.

6. A low profile surface mount electrical connector for connecting an electronic component such as an IC card on a planar surface of a printed circuit board which includes circuit traces thereon, comprising:

a generally flat insulating housing overmolded centrally of two rows of stamped and formed electrical terminals, wherein the two rows of terminals project away from the housing in a mirror-image configuration, and wherein each terminal is generally U-shaped to define a pair of legs joined by a major bend in the terminal, one leg projecting from the housing and having a generally planar surface mount portion for electrical connection to one of the circuit traces on the planar surface of the printed circuit board and the other leg defining a cantilevered contact arm portion folded back over the surface mount portion for electrical connection to said electronic component, wherein the major bend in the terminal joining the legs is located on a distal end of the planar surface mount portion opposite the housing.

7. The low profile surface mount electrical connector of claim 6 wherein the generally planar surface mount portion of each terminal is wider than the contact arm portion thereof.

8. The low profile surface mount electrical connector of claim 6 wherein said insulating housing includes a pair of spaced projections for guiding the IC card into engagement with the contact arm portions of the terminals.

9. The low profile surface mount electrical connector of claim 6 wherein the contact arm portion of each terminal includes an outwardly bowed contact section for positively engaging the electronic component.

10. The low profile surface mount electrical connector of claim 9 wherein said bowed contact section is narrower than the surface mount portion of the terminal.

11. A surface mount electrical connector for connecting an electronic component on a planar surface of a printed circuit board which includes at least one circuit trace thereon, comprising:

an insulating body mounting two rows of stamped and formed electrical terminals, wherein said body is generally rectangular and is located between the two rows of terminals, wherein the body includes a bottom surface, and wherein each of said terminals includes a generally planar surface mount portion projecting away from the body generally coplanar with the bottom surface thereof for electrical connection to the circuit trace on the printed circuit board and a cantilevered contact arm portion integral with and projecting from the surface mount portion toward the body and folded back over the surface mount portion for electrical connection to said electronic component.

12. The surface mount electrical connector of claim 11 wherein said insulating body includes a pair of spaced projections for guiding an IC card into engagement with the contact arm portions of the terminals.

13. The surface mount electrical connector of claim 11 wherein the generally planar surface mount portion of each terminal is wider than the contact arm portion thereof.

14. The surface mount electrical connector of claim 13 wherein the contact arm portion of each terminal includes an outwardly bowed contact section for positively engaging the electronic component.

15. The surface mount electrical connector of claim 14 wherein said bowed contact section is narrower than the surface mount portion of the terminal.

* * * * *